(12) United States Patent
Chatterjee et al.

(10) Patent No.: US 11,984,766 B2
(45) Date of Patent: May 14, 2024

(54) METHOD AND APPARATUS FOR COOLING A ROTOR ASSEMBLY

(71) Applicant: GE AVIATION SYSTEMS LLC, Grand Rapids, MI (US)

(72) Inventors: Anirban Chatterjee, Bangalore (IN); Balamurugan Sridharan, Bangalore (IN); Mohammad Khaja Mohiddin Shaik, Bangalore (IN); Sarveshwar Chandrakant Wadgaonkar, Bangalore (IN); Mamatha Ramakrishnaiah, Bangalore (IN)

(73) Assignee: GE Aviation Systems LLC, Grand Rapids, MI (US)

( * ) Notice: Subject to any disclaimer, the term of this patent is extended or adjusted under 35 U.S.C. 154(b) by 112 days.

(21) Appl. No.: 17/587,313

(22) Filed: Jan. 28, 2022

(65) Prior Publication Data

US 2023/0246498 A1    Aug. 3, 2023

(51) Int. Cl.
| | |
|---|---|
| *H02K 1/32* | (2006.01) |
| *H02K 1/28* | (2006.01) |
| *H02K 7/18* | (2006.01) |
| *H02K 9/19* | (2006.01) |

(52) U.S. Cl.
CPC ............... *H02K 1/32* (2013.01); *H02K 1/28* (2013.01); *H02K 9/19* (2013.01); *H02K 7/1823* (2013.01)

(58) Field of Classification Search
CPC .. H02K 1/32; H02K 1/28; H02K 9/19; H02K 7/1823
See application file for complete search history.

(56) References Cited

U.S. PATENT DOCUMENTS

| | | | |
|---|---|---|---|
| 3,048,725 | A | 8/1962 | Wesolowski |
| 5,140,204 | A | 8/1992 | Cashmore et al. |
| 5,666,016 | A | 9/1997 | Cooper |
| 7,855,487 | B2 | 12/2010 | Lemmers, Jr. et al. |
| 7,902,702 | B2 | 3/2011 | Hashiba |
| 8,269,393 | B2 | 9/2012 | Patel et al. |
| 8,575,798 | B2 | 11/2013 | Takahashi et al. |
| 9,024,500 | B2 | 5/2015 | Kimura et al. |
| 9,614,407 | B2 | 4/2017 | Nishikawa |
| 10,333,365 | B2 | 6/2019 | Patel et al. |
| 10,554,088 | B2 | 2/2020 | Huang et al. |
| 2011/0133579 | A1* | 6/2011 | Vanderzyden ......... H02K 3/527 310/43 |
| 2016/0211712 | A1 | 7/2016 | Patel et al. |

(Continued)

FOREIGN PATENT DOCUMENTS

| | | |
|---|---|---|
| CN | 106787579 A | 5/2017 |
| EP | 0615333 B1 | 6/1997 |

(Continued)

*Primary Examiner* — Christopher M Koehler
*Assistant Examiner* — Riley Owen Stout
(74) *Attorney, Agent, or Firm* — McGarry Bair PC (57) ABSTRACT

A rotor assembly includes a rotor core having a rotatable shaft and defining at least one rotor post, a winding wound around the post that defines an end turn, and a coil support assembly including a coil support disc rotatably coupled to the rotatable shaft and comprising a radially inner portion and a radially outer portion coupled via a set of spokes. The radially outer portion overlies an end turn and defines a set of channels therethrough sized and disposed to receive a flow of fluid from the set of rotor windings.

16 Claims, 9 Drawing Sheets

(56) References Cited

U.S. PATENT DOCUMENTS

| | | |
|---|---|---|
| 2016/0211713 A1 | 7/2016 | Patel et al. |
| 2020/0106342 A1 | 4/2020 | Chatterjee |
| 2020/0212742 A1 | 7/2020 | Sridharan et al. |
| 2023/0179049 A1* | 6/2023 | Fulton .................... H02K 9/197 |
| | | 310/52 |

FOREIGN PATENT DOCUMENTS

| | | |
|---|---|---|
| EP | 3046230 B1 | 9/2018 |
| EP | 2568574 B1 | 4/2019 |
| FR | 2984034 A1 | 6/2013 |
| FR | 3079978 A1 | 10/2019 |
| WO | 2009029743 A1 | 3/2009 |
| WO | 2020020551 A1 | 1/2020 |
| WO | 2020128888 A1 | 6/2020 |
| WO | 2020191167 A1 | 9/2020 |

\* cited by examiner

METHOD AND APPARATUS FOR COOLING A ROTOR ASSEMBLY

BACKGROUND

Electric machines, such as electric motors or electric generators, are used in energy conversion. Such electrical machines operate through the interaction of magnetic fields, and current carrying conductors generate the force or electricity respectively. Typically, an electrical motor converts electrical energy into mechanical energy. Conversely, an electrical generator converts mechanical energy into electrical energy. For example, in the aircraft industry, it is common to combine a motor mode and a generator mode in the same electric machine, where the electric machine in motor mode functions to start the engine, and, depending on the mode, also functions as a generator.

Regardless of the mode, an electric machine typically includes a rotor having rotor windings that are driven to rotate by a source of rotation, such as a mechanical or electrical machine, which for some aircraft may be a gas turbine engine. Heat is generated in the rotor due to the flow of current through the windings, and changing magnetic fields present in the rotor, causing the temperature to rise in the rotor. It is desirable to cool the rotor to protect the electrical machine from damage and to increase the electrical machine power density to allow for more power from a smaller physically sized electric motor.

DETAILED DESCRIPTION

Aspects of the disclosure can be implemented in any environment using an electric motor regardless of whether the electric motor provides a driving force or generates electricity. For purposes of this description, such an electric motor will be generally referred to as an electric machine, electric machine assembly, or similar language, which is meant to clarify that one or more stator/rotor combinations can be included in the machine. While this description is primarily directed toward an electric machine providing power generation, it is also applicable to an electric machine providing a driving force or an electric machine providing both a driving force and power generation. Further, while this description is primarily directed toward an aircraft environment, aspects of the disclosure are applicable in any environment using an electric machine. Thus, a brief summary of a contemplated environment should aid in a more complete understanding.

While "a set of" various elements will be described, it will be understood that "a set" can include any number of the respective elements, including only one element. As used herein, the terms "axial" or "axially" refer to a dimension along a longitudinal axis of a generator or along a longitudinal axis of a component disposed within the generator.

As used herein, the terms "radial" or "radially" refer to a dimension extending between a center longitudinal axis, an outer circumference, or a circular or annular component disposed thereof. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

As used herein, a "wet" cavity generator includes a cavity housing the rotor and stator that is exposed to free liquid coolant (e.g. coolant freely moving within the cavity). In contrast, a "dry" cavity generator the rotor and stator can be cooled by coolant contained within limited in fluidly sealed passages (e.g. non-freely moving about the cavity).

The exemplary drawings are for purposes of illustration only and the dimensions, positions, order and relative sizes reflected in the drawings attached hereto can vary.

Figure 1:
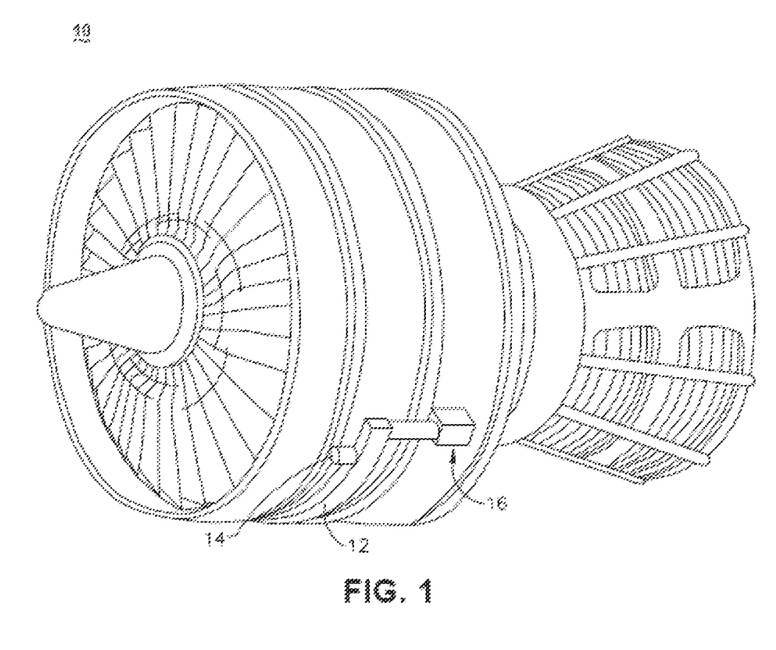
FIG. 1 is an isometric view of a gas turbine engine having a generator, in accordance with various aspects described herein.

FIG. 1 illustrates a gas turbine engine 10 having an accessory gear box (AGB) 12 and an electric machine or generator 14 according to an aspect of the disclosure. The gas turbine engine 10 can be a turbofan engine, such as a General Electric GEnx or CF6 series engine, commonly used in modern commercial and military aviation or it could be a variety of other known gas turbine engines such as a turboprop or turboshaft. The AGB 12 can be coupled to a turbine shaft (not shown) of the gas turbine engine 10 by way of a mechanical power take off 16. The gas turbine engine 10 can be any suitable gas turbine engine used in modern aviation or it could be a variety of other known gas turbine engines such as a turboprop or turboshaft. The type and specifics of the gas turbine engine 10 are not germane to the disclosure and will not be described further herein.

While a generator 14 is shown and described, aspects of the disclosure are not so limited, and aspects can include any electromotive or electrical machine, such as, without limitation, a motor, or generator.

Figure 2:
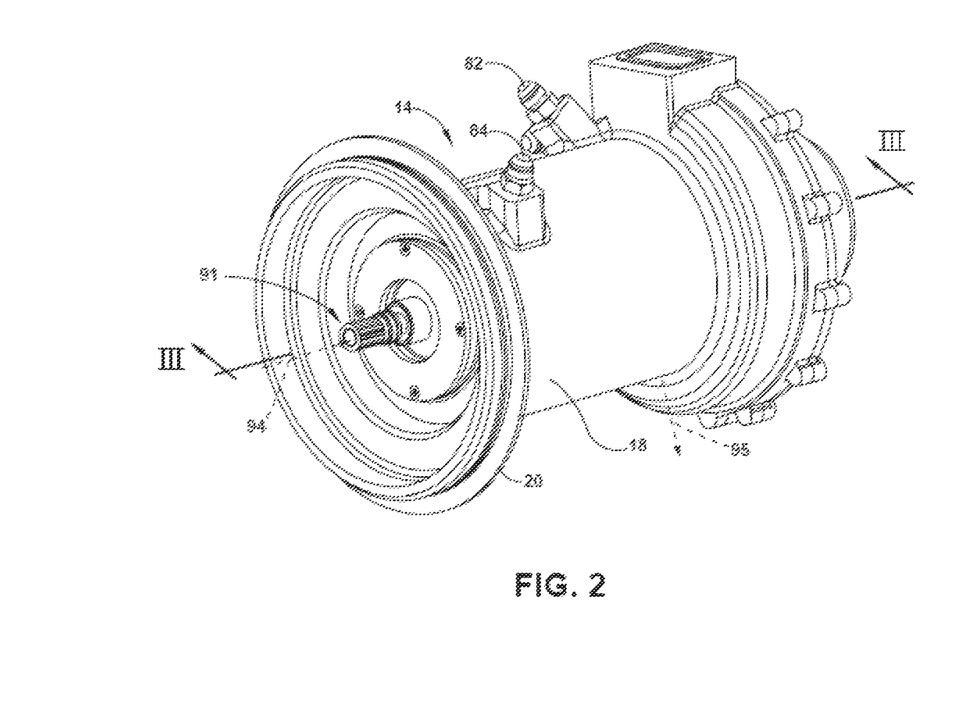
FIG. 2 is an isometric view of an exterior of the generator of FIG. 1, in accordance with various aspects described herein.

FIG. 2 more clearly illustrates a non-limiting example of generator 14 and its housing 18 in accordance with aspects of the disclosure. The generator 14 can include a clamping interface 20, used to clamp the generator 14 to the AGB (not shown). Multiple electrical connections can be provided on the exterior of the generator 14 to provide for the transfer of electrical power to and from the generator 14. The electrical connections can be further connected by cables to an electrical power distribution node of an aircraft having the gas turbine engine 10 to power various items on the aircraft, such as lights and seat-back monitors. The generator 14 can include a liquid coolant system for cooling or dissipating heat generated by components of the generator 14 or by components proximate to the generator 14, one non-limiting example of which can be the gas turbine engine 10. For example, the generator 14 can include a liquid cooling system using oil as a coolant.

The liquid cooling system can include a cooling fluid inlet port 82 and a cooling fluid outlet port 84 for controlling the supply of coolant to the generator 14. In one non-limiting example, the cooling fluid inlet and output ports 82, 84 can be utilized for cooling at least a portion of a rotor or stator of the generator 14. The liquid cooling system can also include a second coolant outlet port 91, shown at a rotatable shaft portion of the generator 14. Optionally, by way of non-limiting example, the liquid cooling system can include a rotatable shaft coolant inlet port 94 or a generator coolant outlet port 95. While not shown, aspects of the disclosure can further include other liquid cooling system components, such as a liquid coolant reservoir fluidly coupled with the cooling fluid inlet port 82, the rotatable shaft coolant inlet port 94, the cooling fluid outlet port 84, or the generator coolant outlet port 95, and a liquid coolant pump to forcibly supply the coolant through the ports 82, 84, 94, 95 or generator 14.

Figure 3:
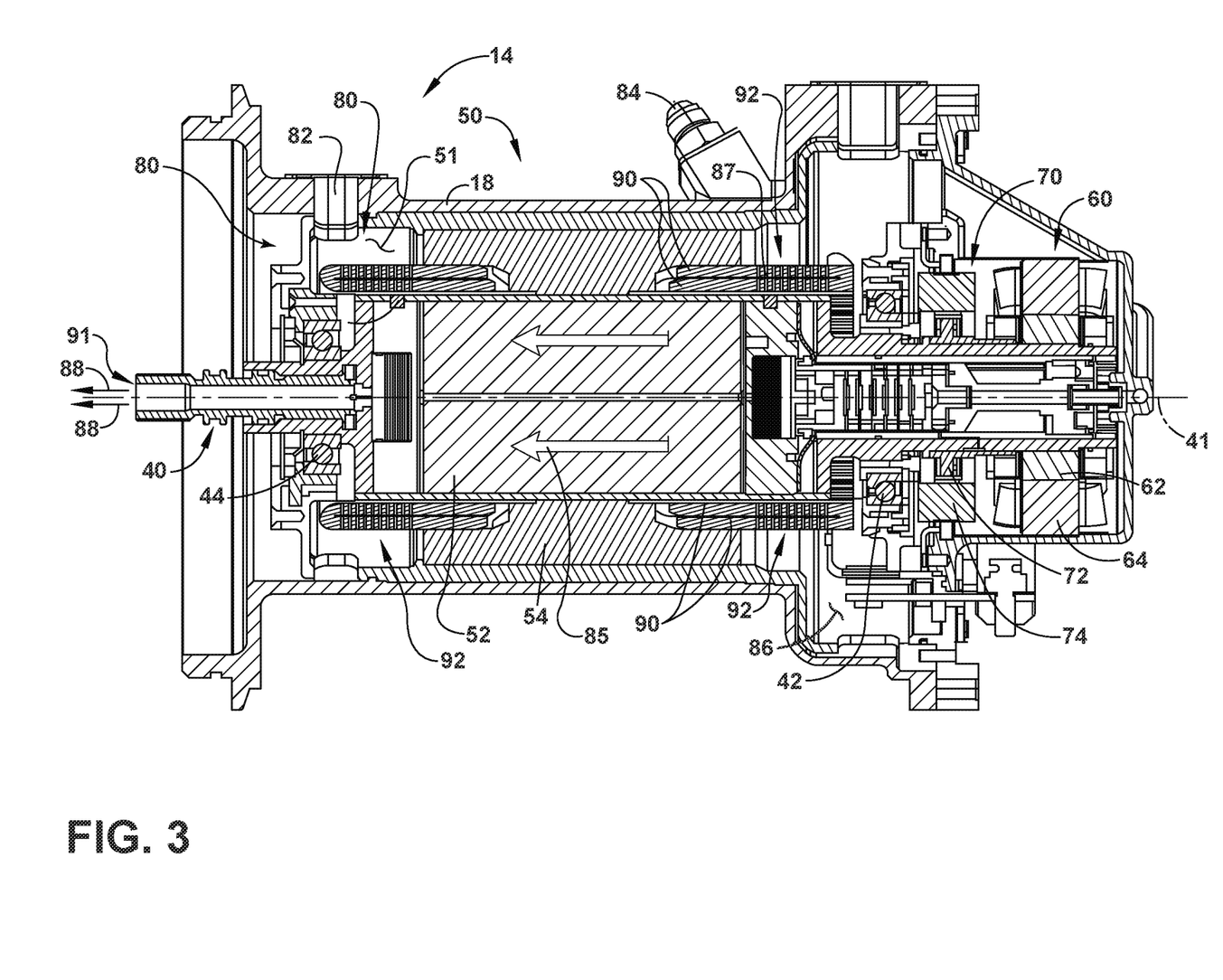
FIG. 3 is a schematic cross-sectional view of the generator of FIG. 2, taken along line of FIG. 2, in accordance with various aspects described herein.

A non-limiting interior of the generator 14 is best seen in FIG. 3, which is a cross-sectional view of the generator 14 shown in FIG. 2 taken along line A rotatable shaft 40 is located within the generator 14 and is the primary structure for supporting a variety of components. The rotatable shaft 40 can have a single diameter or one that can vary along its length. The rotatable shaft 40 is supported by spaced bearings 42 and 44 and configured to rotate about a rotational axis 41. Several of the elements of the generator 14 have a fixed component and a rotating component, with the fixed component fixed relative to the housing 18 and with the rotating component being provided on, or rotatably fixed relative to the rotatable shaft 40. Examples of these elements can include a main machine 50, housed within a main machine cavity 51, an exciter 60, and a permanent magnet generator (PMG) 70. The corresponding rotating component comprises a main machine rotor 52, an exciter rotor 62, and a PMG rotor 72, respectively, and the corresponding fixed component comprises a main machine stator 54 or stator core, an exciter stator 64, and a PMG stator 74. In this manner, the main machine rotor 52, exciter rotor 62, and PMG rotor 72 are disposed on and co-rotate with the rotatable shaft 40. The fixed components can be mounted to any suitable part of the housing 18, and include the main machine stator 54, exciter stator 64, and PMG stator 74. Collectively, the fixed components define an interior through which the rotatable shaft 40 extends and rotates relative thereto.

It will be understood that the main machine rotor 52, exciter rotor 62, and PMG rotor 72 can have a set of rotor poles, and that the main machine stator 54, exciter stator 64, and PMG stator 74 can have a set of stator poles. The set of rotor poles can generate a set of magnetic fields relative to the set of stator poles, such that the rotation of the rotor magnetic fields relative to the stator poles generate current in the respective stator components.

At least one of the rotor poles and stator poles can be formed by a core with a post and wire wound about the post to form a winding, with the winding having at least one end turn. Aspects of the disclosure shown include at least one set of stator windings 90 arranged longitudinally along the housing 18, that is, in parallel with housing 18 and the rotational axis 41. The set of stator windings 90 can also include a set of stator winding end turns 92 extending axially beyond opposing ends of a longitudinal length of a main machine stator 54.

The components of the generator 14 can be any combination of known generators. For example, the main machine 50 can be either a synchronous or asynchronous generator. In addition to the accessories shown in this aspect, there can be other components that need to be operated for particular applications. For example, in addition to the electromechanical accessories shown, there can be other accessories driven from the same rotatable shaft 40 such as the liquid coolant pump, a fluid compressor, or a hydraulic pump.

As explained above, the generator 14 can be oil cooled and thus can include a cooling system 80. The cooling oil can be used to dissipate heat generated by the electrical and mechanical functions of the generator 14. The cooling system 80 using oil can also provide for lubrication of the generator 14. In the illustrated aspects, the generator 14 can be a liquid cooled, wet cavity type cooling system 80 including the cooling fluid inlet port 82 and the cooling fluid outlet port 84 for controlling the supply of the cooling fluid to the cooling system 80. The cooling system 80 can further include, for example, a cooling fluid reservoir 86 and various cooling passages. The rotatable shaft 40 can provide one or more channels or paths for coolant or fluid coolant flow 85 (shown schematically as arrows) for the main machine rotor 52, exciter rotor 62, and PMG rotor 72, as well as a rotor shaft cooling fluid outlet 88, such as the second coolant outlet port 91, wherein residual, unused, or unspent oil can be discharged from the rotatable shaft 40.

In non-limiting examples of the generator 14, the fluid coolant flow 85 can further be directed, exposed, sprayed, or otherwise deposited onto the set of stator windings 90, the set of stator winding end turns 92, or onto alternative or additional components. In this example, the fluid coolant flow 85 can flow from the rotatable shaft 40 radially outward toward the set of stator windings 90 or the set of stator winding end turns 92. In this sense, the coolant can cool the respective set of stator windings 90 or set of stator winding end turns 92.

Figure 4:
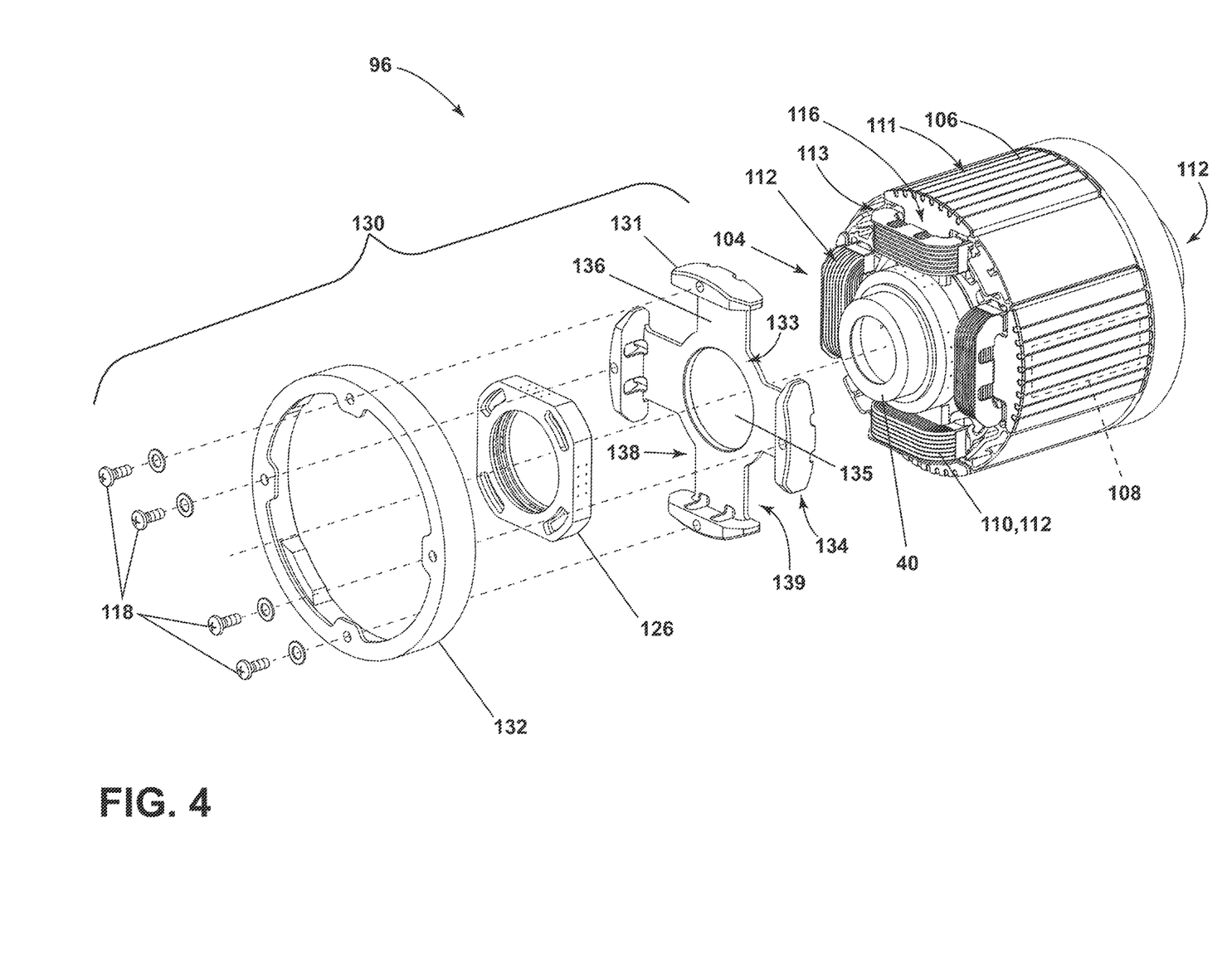
FIG. 4 illustrates a partially exploded isometric view of a rotor assembly and coil support for the generator of FIG. 3, in accordance with various aspects described herein.

FIG. 4 illustrates a partially exploded perspective view of a rotor assembly 96 such as for a main electrodynamic machine. As shown, the rotor assembly 96 can include a rotor core 100, such as a laminated rotor core, rotatably connected to co-rotate with the rotatable shaft 40. The rotor assembly 96 can include a set of coil support assemblies 130. Each coil support assembly 130 can respectively include a coil support disc 131 and a retaining ring 132. In some aspects, each coil support assembly 130 can further include a respective coolant spray ring 125.

The rotor assembly 96 can further define a first end 102 and a second end 104, axially spaced from the first end 102.

The rotor assembly 96 can include at least one rotor pole 106 defined by a rotor post 108 and formed when at least a portion of the rotor core 100 is wound with a conductive rotor wiring or rotor windings 110 about the rotor post 108. The rotor windings 110 wound around the rotor post 108 can define an axial winding portion 111 extending axially along the rotor core 100, and rotor winding end turns 112 extending axially beyond the rotor core 100. In the perspective of the illustrated example, the rotor post 108 can underlie the set of rotor windings 110. While the rotor windings 110 or the rotor winding end turns 112 can refer to a set of or plural windings or end turns, an end turn can include only one of the set of rotor windings 110, or only one portion of the set of rotor windings 110 extending axially beyond the rotor core 100, such as only at the first end 102 or the second end 104.

The set of rotor winding end turns 112 can define a respective loop or arcuate bight portion 113 disposed axially beyond the rotor core 100. In non-limiting aspects, each bight portion 113 can define a respective channel 116 extending therethrough. For example, in non-limiting aspects each respective channel 116 can have a width defined by a width of corresponding rotor post 108.

In non-limiting aspects, the coil support assembly 130 can be disposed at either end 102, 104 of the rotor assembly 96. For example, in some aspects, a single coil support assembly 130 can be disposed at one end of the rotor assembly 96. In other non-limiting aspects, a respective coil support assembly 130 can be disposed at each end of the rotor assembly 96.

A respective coil support assembly 130 can be fixedly coupled to each end of the rotatable shaft 40 of the rotor assembly 96. For example, a respective coil support assembly 130 can be coupled to one end (e.g., either the first end 102 or the second end 104) of the rotor assembly 96. In other aspects, a respective coil support assembly 130 can be coupled to the rotatable shaft 40 at both the first end 102 and the second end 104 of the rotor assembly 96.

The coil support disc 131 can comprise a radially inboard or central portion 133 and an outer portion 134 disposed radially outward from the central portion 133. In aspects, the central portion 133 can define a bore 135 therethrough. The central portion 133 can be coupled to the outer portion 134 via a set of radially extending spokes 136. For example, in some aspects, each spoke 136 can comprise a first end 138 coupled to the central portion 133, and an opposing second end 139 coupled to the outer portion 134. In non-limiting aspects the spokes 136 can be circumferentially spaced from each other about the coil support disc 131.

In non-limiting aspects, the number of spokes 136 can correspond to the number of rotor poles 106 of the rotor assembly 96. In aspects, each spoke 136 can be operatively disposed between the rotor core 100 and a respective set of rotor winding end turns 112. For example, in non-limiting aspects, each spoke 136 can be disposed within a respective channel 116 and extend therethrough. In this sense, each set of rotor winding end turns 112 can be wound or wrapped at least partially about a respective spoke 136. The central portion 133 of the coil support disc 131 can at least partially underlie the rotor winding end turns 112. In this example, "underlie" denotes a relative position radially closer to the rotational axis 41. In some aspects, each spoke 136 can be at least partially surrounded by a respective set of rotor winding end turns 112 and provide support or limit a radial deflection or relative axial movement the respective set of rotor winding end turns 112.

In non-limiting aspects, the number of spokes 136 of the coil support disc 131 can correspond to the number of rotor poles 106 of the rotor assembly 96. In non-limiting aspects, each respective spoke 136 can have a width defined by a width of a corresponding rotor post 108 (FIG. 4). Other aspects are not so limited, and each respective spoke 136 can have a width that is narrower than a corresponding rotor post 108, or wider than a corresponding rotor post 108, without departing from the scope of the disclosure.

Figure 5:
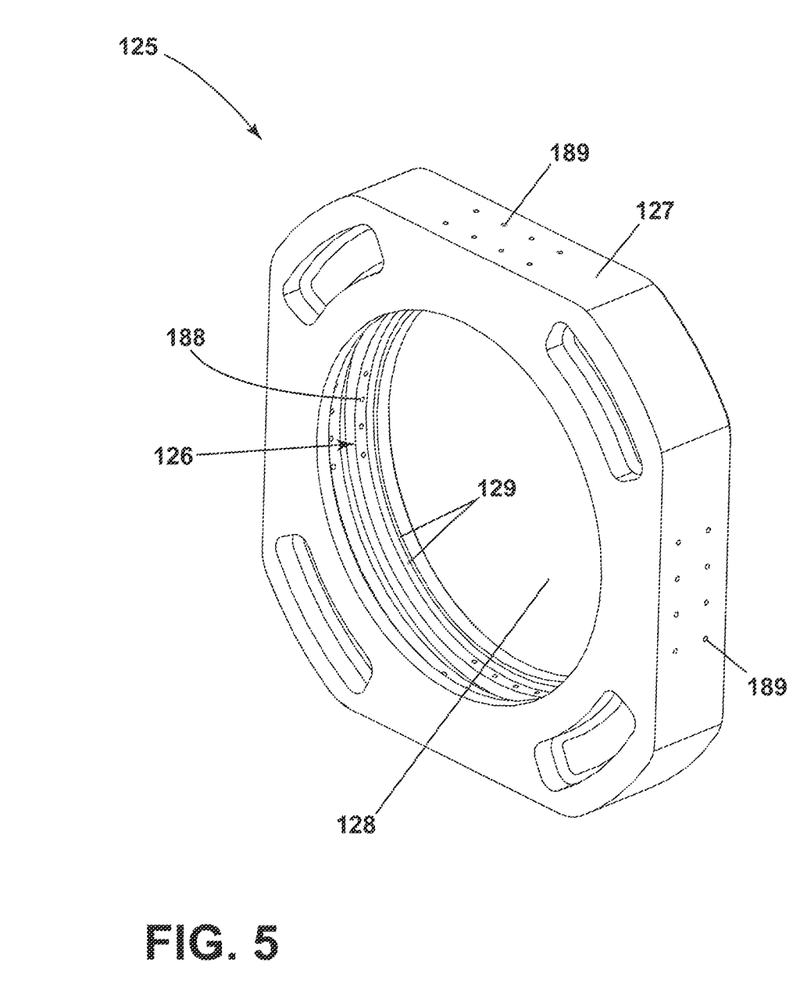
FIG. 5 illustrates a perspective view of the oil spray ring of the rotor assembly of FIG. 4, in accordance with various aspects described herein.
Figure 5A:
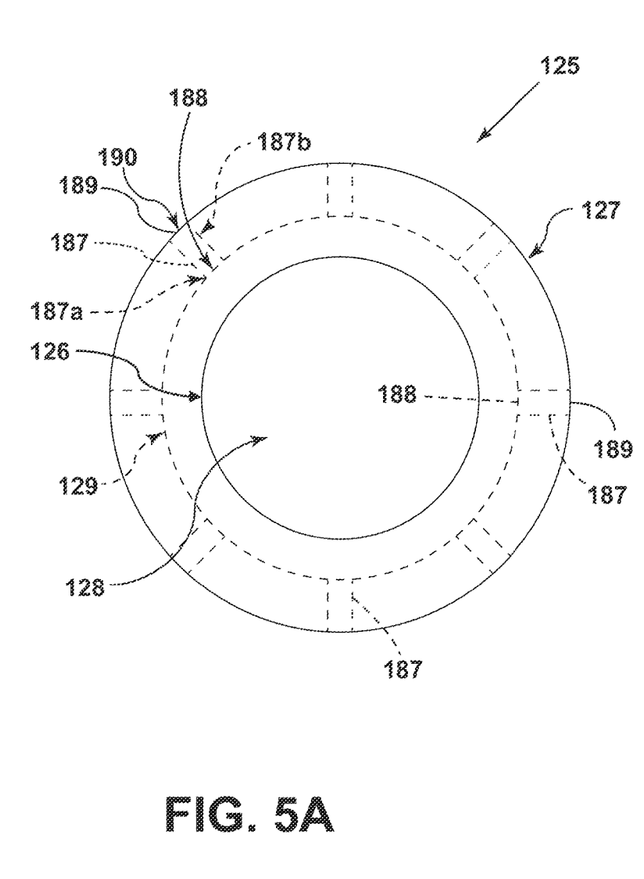
FIG. 5A depicts an isometric front view of another non-limiting aspect of the oil spray ring in accordance with various aspects as described herein FIG. 6 a perspective view of the coil support ring of the rotor assembly of FIG. 4, in accordance with various aspects described herein.

Non-limiting aspects of the coolant spray ring 125 will be described in more detail with simultaneous reference to FIGS. 5 and 5A. FIG. 5 depicts a perspective view of an exemplary non-limiting aspect of the coolant spray ring 125, and FIG. 5A depicts another non-limiting aspect of the coolant spray ring 125 of FIG. 5 in an isometric front view.

In non-limiting aspects, the coolant spray ring 125 can comprise an annular member having an inwardly facing, or radially inner surface 126 and an opposing outwardly facing, or radially outer surface 127. In non-limiting aspects the radially inner surface 126 can define a bore 128 sized to receive the rotatable shaft 40 therethrough and to receive a flow of coolant therefrom. As such, the radially inner surface 126 can operatively define a coolant collection surface. In some aspects, the radially inner surface 126 can be a relatively smooth surface. In other non-limiting aspects, the radially inner surface 126 can define one or more channels or grooves 129 thereon. The grooves 129 can be arranged in fluid communication with the rotatable shaft 40. As such the one or more grooves 129 can operatively define a coolant reservoir.

The coolant spray ring 125 can further include a set of coolant channels 187 defined therethrough. The coolant channels 187 can be sized to allow a flow of coolant fluid therethrough. In non-limiting aspects the coolant channels 187 can be circumferentially spaced from each other about the coolant spray ring 125. Each coolant channel 187 can extend radially from a first end 187a at the radially inner surface 126 to an opposing second end 187b at the radially outer surface 127. Each coolant channel 187 can comprise a coolant inlet 188 defined on the radially inner surface 126, and a corresponding coolant outlet 189 defined on the radially outer surface 127, at the opposing second end 187b.

In aspects, the coolant channels 187 can be in fluid communication with the rotatable shaft 40, or the one or more grooves 129, or both, to receive the flow of coolant therefrom. Each coolant outlet 189 can comprise a respective spray nozzle 190. The spray nozzles 190 can be disposed at circumferentially spaced intervals on the radially outward surface 127.

The coolant spray ring 125 can be fixed to the rotatable shaft 40 using one or more bolts, screws, pins, keys, or other known fasteners (not shown). In other non-limiting aspects, the coolant spray ring 125 can be coupled to the rotatable shaft 40 via an interference, friction, or press-fit engagement between the coolant spray ring 125 and the rotatable shaft 40. Other aspects are not so limited, and it is contemplated that the coolant spray ring 125 can be rotatably coupled to the rotatable shaft 40 by any desired affixing mechanisms. It will be appreciated that when so coupled, a rotation of the rotatable shaft 40 will result in rotation of the coolant spray ring 125.

Referring back to FIG. 4, in non-limiting aspects, the retaining ring 132 be disposed to surround the coil support disc 131. For example, in non-limiting aspects, the retaining ring 132 can overlie or radially surround the coil support disc 131. The retaining ring 132 can be rigidly or fixedly coupled to the coil support disc 131. For example, the retaining ring 132 can be coupled to the coil support disc 131 using bolts or other fasteners 118. When so coupled, the retaining ring and 132 can limit or arrest an axial movement of the coil support disc 131. In aspects the retaining ring 132 and coil support disc 131 can cooperatively limit a radial deflection or relative movement of the rotor winding end turns 112.

Figure 6:
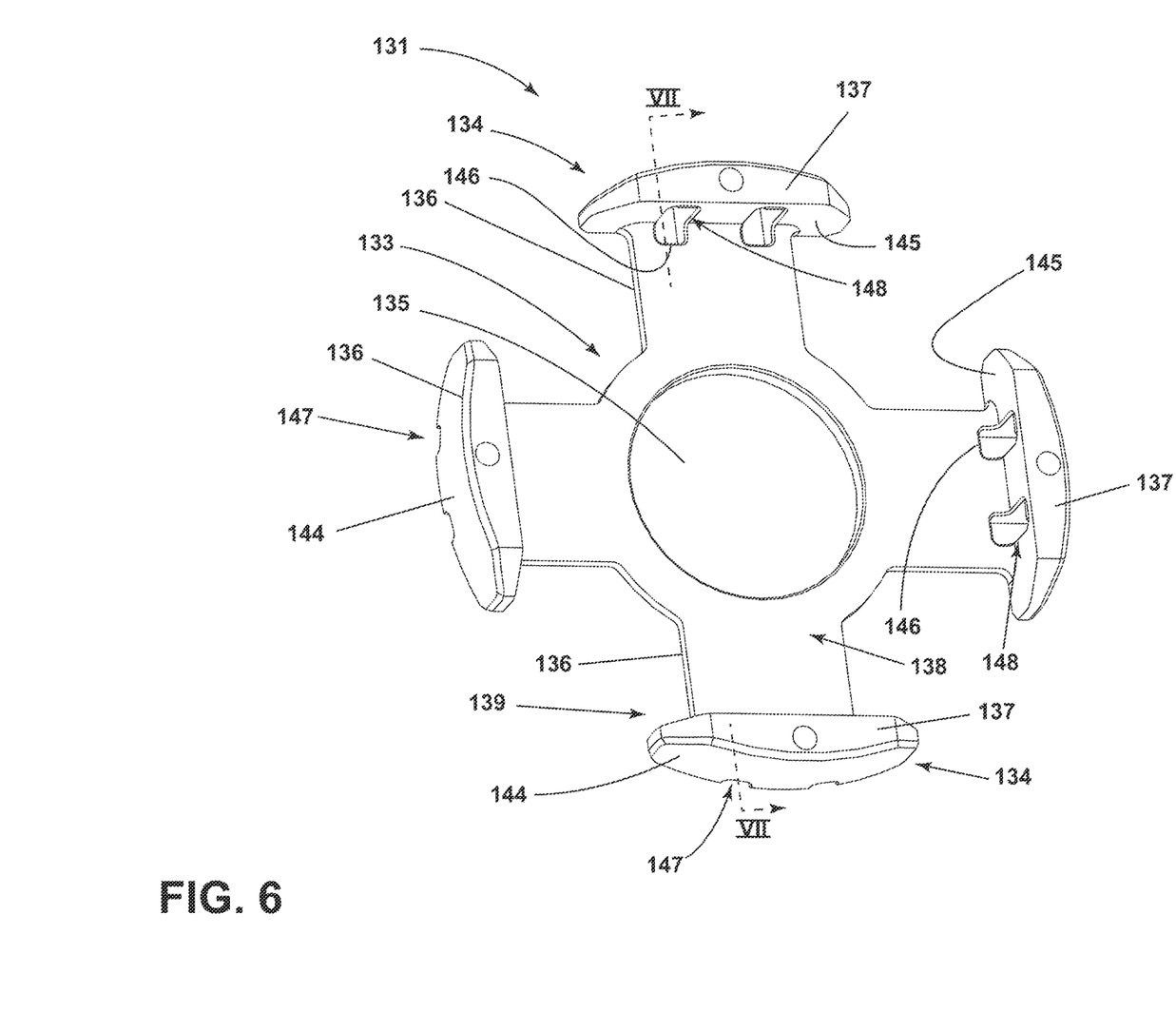
Figure 6A:
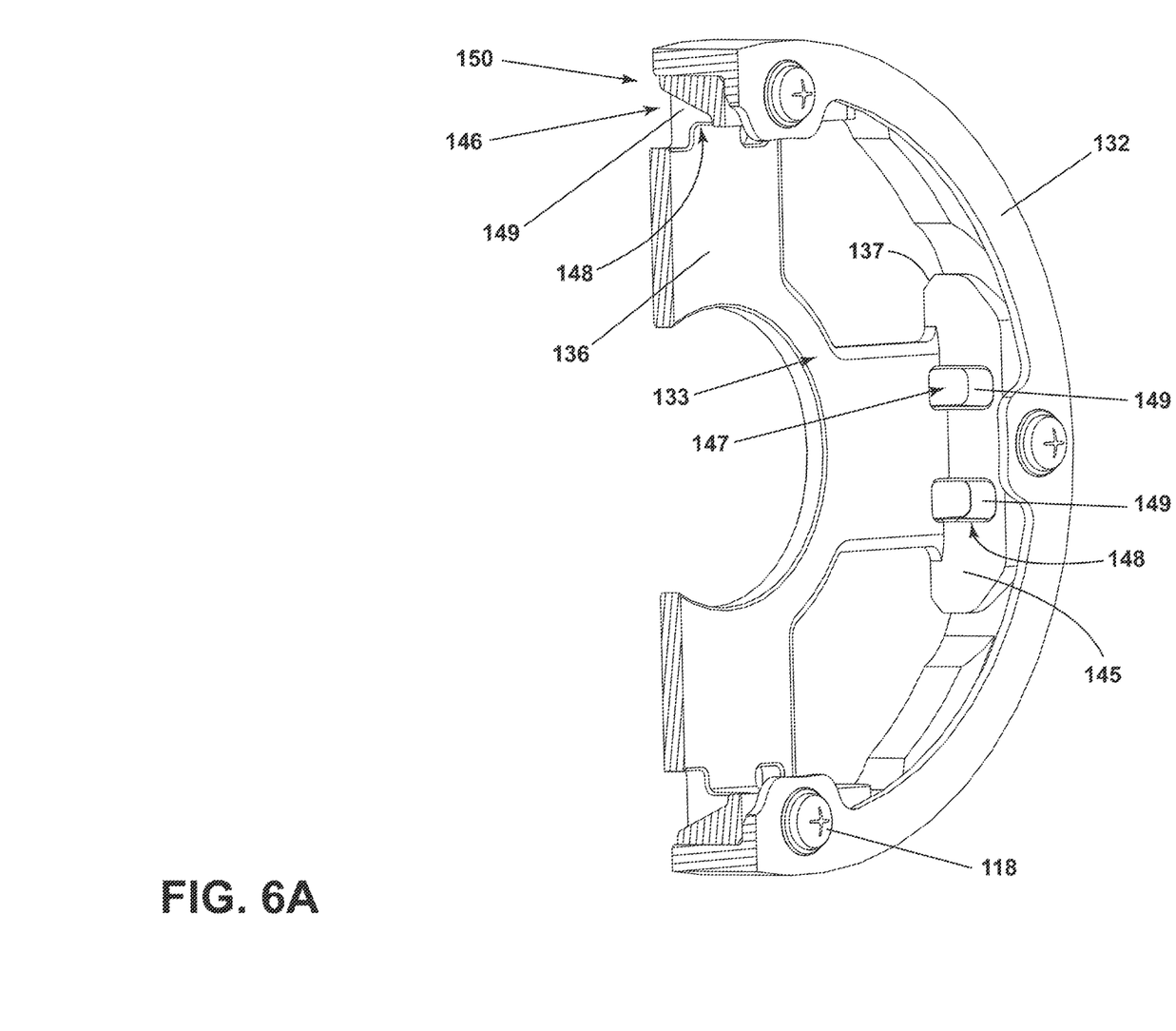
FIG. 6A depicts a schematic cross-sectional view of the coil support ring of FIG. 6, taken along line VII-VII of FIG. 6, in accordance with various aspects described herein.

Non-limiting aspects of the coil support disc 131 will be described in more detail with simultaneous reference to FIGS. 6 and 6A. FIG. 6 depicts a perspective view of exemplary non-limiting aspects of the coil support disc 131, and FIG. 6A depicts the coil support disc 131 of FIG. 6 and the retaining ring 132 in partial cut-away view along line A-A. While FIGS. 6 and 6A depict a non-limiting example of the support disc 131 configured for a 4-pole rotor assembly 96, other aspects are not so limited. It will be appreciated that aspects as disclosed herein are not limited to any specific number of rotor poles, and aspects can be adapted to rotor assemblies 96 having any desired number of poles.

In aspects, the outer portion 134 of the coil support disc 131 can comprise a set of elements or segments 137. For example, the outer portion 134 can comprise a set of spaced apart segments 137. Each segment 137 can be coupled to a respective second end 139 of a corresponding spoke 136. In non-limiting aspects, the number of segments 137 can correspond to the number of rotor poles 106 of the rotor assembly 96. As shown, in some aspects the segments 137 can define an arcuate shape. Other aspects are not so limited, and the segments 137 can define any desired shape without departing from the scope of the disclosure. Each segment 137 can comprise a respective outwardly facing, radially outer surface 144, and an opposing inwardly facing, radially inner surface 145. In non-limiting aspects, the radially inner surface 145 can underlie at least a portion of the radially outer surface 144.

The outer portion 134 (e.g., the segments 137) can at least partially overlie the rotor winding end turns (not shown). In this example, "overlie" denotes a relative position radially farther from the rotational axis 41. For example, in non-limiting aspects, each segment 137 can overlie a respective set of rotor winding end turns 112.

As illustrated in FIG. 6A, the outer portion 134 of the support disc 131 can include a set of support disc channels 146 defined therethrough. The support disc channels 146 can be sized to allow flow of cooling fluid (e.g., oil) therethrough. In some aspects, each segment 137 can include one or more support disc channels 146. In other aspects, only a subset of the segments 137 can include one or more support disc channels 146. Each support disc channel 146 can comprise a coolant inlet 148 defined by a corresponding radially inner surface 145, and a coolant outlet 147 defined by a corresponding radially outer surface 144, at an opposing second end of the support disc channel 146. In non-limiting aspects, each support disc channel 146 can further define a fluid collection surface 149 disposed between the coolant inlet 148 and the coolant outlet 147. In non-limiting aspects, the one or more coolant inlets 148 of the coil support disc 131 can be coupled in fluid communication with a respective fluid collection surface 149 defined by a respective support disc channel 146. In a non-limiting aspect, the fluid collection surface 149 can extend in an axial direction from the central portion 133.

In non-limiting aspects, the coil support disc 131 can operatively receive the rotatable shaft 40 through the bore 135. The coil support disc 131 can be fixed to the rotatable shaft 40 using one or more bolts, screws, pins, keys, or other known fasteners. In other non-limiting aspects, the coil support disc 131 can be coupled to the rotatable shaft 40 via an interference, friction, or press-fit engagement between the coil support disc 131 and the rotatable shaft 40. Other aspects are not so limited, and it is contemplated that the coil support disc 131 can be rotatably coupled to the rotatable shaft 40 by any desired affixing mechanisms. It will be appreciated that when so coupled, a rotation of the rotatable shaft 40 will result in rotation of the coil support disc 131.

In non-limiting aspects, the retaining ring 132 can be disposed to surround the support disc 131. For example, in non-limiting aspects, the retaining ring 132 can overlie or radially surround the coil support disc 131. The retaining ring 132 can be rigidly or fixedly coupled to the coil support disc 131. For example, the retaining ring 132 can be coupled to the coil support disc 131 using bolts or other fasteners 118. When so coupled, the retaining ring 132 can limit or arrest an axial movement of the coil support disc 131. In aspects, the retaining ring 132 and coil support disc 131 can cooperatively limit a radial deflection or relative movement of the rotor winding end turns 112.

Figure 7:
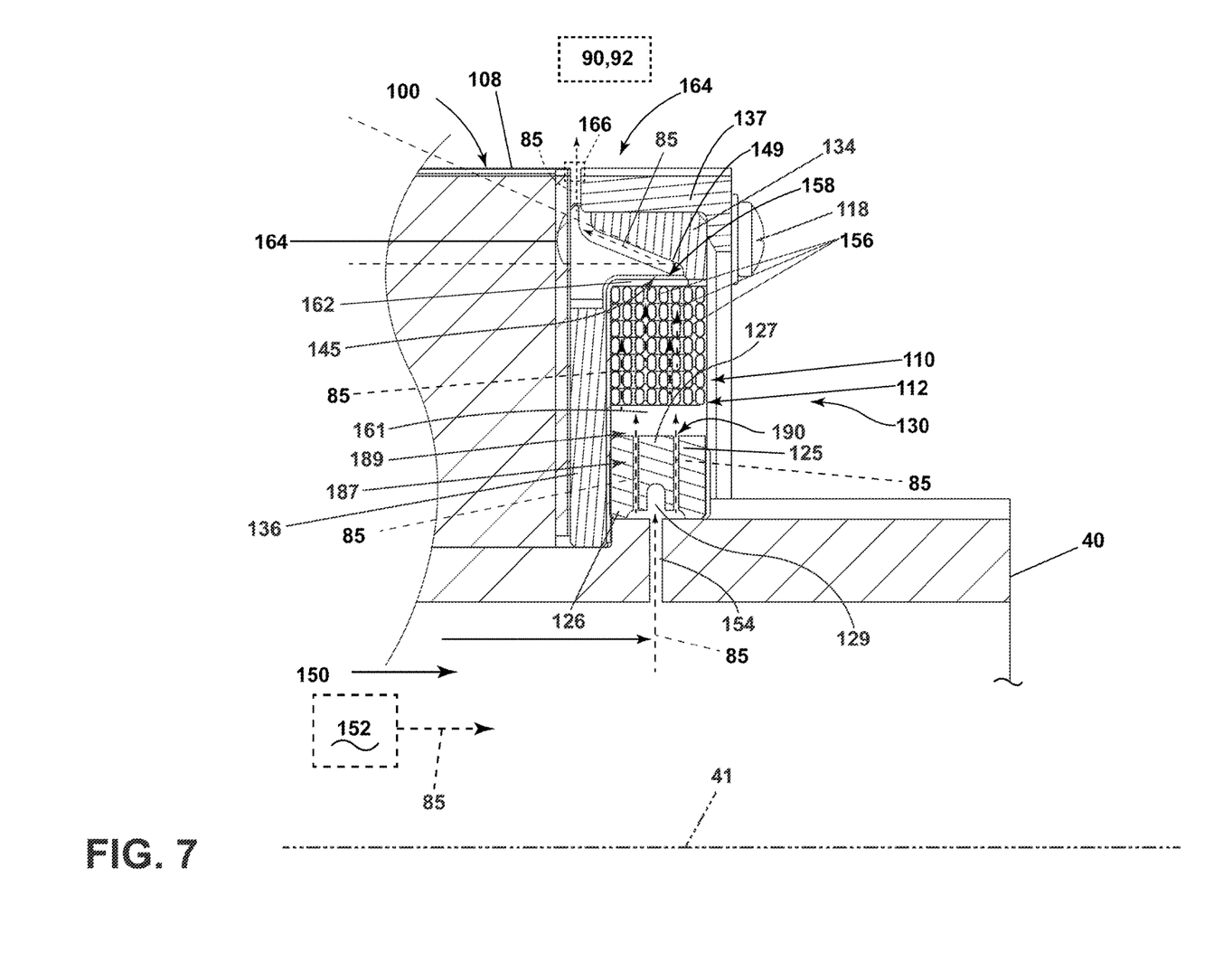
FIG. 7 illustrates a zoomed cross-sectional view of the coil support assembly of the rotor assembly of FIG. 4, in accordance with various aspects described herein.

FIG. 7 illustrates a portion of the rotor assembly 96 of FIG. 4 for better understanding the cooling system 80 and fluid coolant flow 85 from the rotatable shaft 40 to the set of rotor winding end turns 112 and the set of stator winding end turns 92.

The rotatable shaft 40 can define a first coolant conduit 150 fluidly connected with a source of coolant 152. The source of coolant 152 can be, but is not limited to the cooling fluid inlet port (not shown). The direction or location of the source of coolant 152 is not limited by the illustration and can be considered in any location that is fluidly coupled to the first coolant conduit 150. It is further considered that additional conduit, pumps, valves, or other devices can be included to fluidly connect the source of coolant 152 and the first coolant conduit 150.

Fluid can enter the rotatable shaft 40 of the rotor assembly 96 via the inlet port 82. The rotatable shaft 40 at least in part, can define the first coolant conduit 150, through which fluid can flow radially outward from the rotational axis 41 due to the centrifugal force effects of the rotatable shaft 40. A first radial coolant passage 154, by way of extending radially through the rotatable shaft 40, can fluidly couple the first coolant conduit 150 and the coolant spray ring 125.

The coolant spray ring 125 can receive the coolant fluid from the first radial coolant passage 154 via the radially inner surface 126. For example, the coolant fluid can collect or accumulate in the one or more grooves 129 and then be centrifugally conveyed to the coolant channels 187, and to the corresponding coolant outlet 189. The coolant outlets (e.g., spray nozzles 190) can be directed to provide a flow of coolant fluid flow 85 radially outwardly therefrom. In non-limiting aspects, the spray nozzles 190 can operatively spray finely atomized particles of coolant fluid toward the stator end turns using conventional atomization techniques.

A first cavity 161 can be cooperatively defined by the rotatable shaft 40, or the coolant spray ring 125, or both, and the rotor winding end turns 112. The first cavity can underlie at least a portion of the rotor winding end turns 112. For example, in non-limiting aspects, each first cavity 161 can be defined between the rotor winding end turns 112 and a the radially outer surface 127 of the coolant spray ring 125. In aspects, each first cavity 161 can be disposed relative to and underlying one of the sets of rotor winding end turns 112

In non-limiting aspects, a second cavity 162 can be cooperatively defined by the outer portion 134 of the coil support disc 131 and the rotor winding end turns 112. For example, in non-limiting aspects, each second cavity 162 can be defined between the rotor winding end turns 112 and a respective radially inner surface 145. In aspects, each second cavity 162 can be disposed relative to and overlying a respective set of rotor winding end turns 112.

As shown, the rotor winding end turns 112 can include a set of radial rotor end turn passages 156. As used herein, the set of radial rotor end turn passages 156 refers to a set of radially extending passages between the rotor windings 110 that fluidly couple the first cavity 161 to the second cavity 162.

In non-limiting aspects, each second cavity 162, or radially inner surface 145 of the coil support disc, or both, can be coupled in fluid communication with rotor end turn passages 156. Additionally, in non-limiting aspects, each second cavity 162 can be coupled in fluid communication with a respective support disc channel 146.

In non-limiting aspects, a gap or outlet channel 163 can cooperatively be defined by the coil support assembly 130 and the rotor core 100. In non-limiting aspects, the outlet channel 163 can be in fluid communication with the set of support disc channels 146. For example, the outlet channel 163 can be disposed at the radially outer surface 144 or an outer circumference 164 of the rotor assembly 96. Optionally, the outlet channel 163 can comprise a nozzle 166 configured to direct coolant toward the set of stator windings 90 or the set of stator winding end turns 92. The outlet channel 163 or nozzle 166 can be at least partially defined by, in contact with, or coupled to an insulating layer 186 located axially between at least part of the rotor core 100 and the end support 120.

In one non-limiting example, the first cavity 161 can be configured to overlie the coolant fluid output volume from the first radial coolant passage 154, a coolant outlet 189, (e.g., a nozzle 190), or a combination thereof, such that fluid centrifugally expelled from the first radial coolant passage 154 or the coolant outlet 189 of the coolant spray ring 125, or both can be received by the first cavity 161. The first cavity 161, can be configured to limit or restrict where fluid received from the first radial coolant passage 154, or the nozzles 190, traverses radially, axially, or a combination thereof, such that the fluid is reliably delivered radially from the first cavity 161 to the rotor winding end turns 112 or the radial rotor end turn passages 156, and then to the radially inner surface 145 of the coil support disc 131.

In non-limiting aspects, the fluid collection surface 149 can be configured relative to the coil support disc 131 such that a fluid received by the coolant inlets 148 (such as in a radially outward direction) is delivered to the corresponding support disc channel 146. The fluid can be collected and redirected by the fluid collection surface 149 toward the coolant outlet 147, via a respective support disc channel 146, such as in an axially inward direction (e.g., toward the rotor core 100). Additionally, or alternatively, the fluid collection surface 149 can include other known fluid direction geometries or components. Also, as illustrated, the fluid collection surface 149 can be angled relative to the rotational axis 41, shown as angle 165, such that the fluid collection surface 149 receives and redirects the fluid coolant flow 85 expelled radially outward from the coil support disc 131. The angle 165 can be configured to further redirect fluid received by the fluid collection surface 149 toward the coolant outlet 147. The outlet channel 163 can then centrifugally receive the fluid coolant flow 85 from one or more support disc channels 146 and can radially expel the fluid coolant flow 85 from the coil support assembly 130 past the rotor winding end turns 112.

The coolant outlet 147 can be disposed at the radially outer surface 144 or an outer circumference 164 of the rotor assembly 96. Optionally, the coolant outlet 147 can be configured to direct coolant toward the set of stator windings 90 or the set of stator winding end turns 92. The coolant outlet 142 or nozzle 166 can be at least partially defined by, in contact with, or coupled to an insulating layer 186 located axially between at least part of the rotor core 100 and the coil support assembly 130.

The second cavity 162 can be in fluid communication with the outlet channel 163 via set of support disc channels 146 such that the rotation of the rotatable shaft 40 about the rotational axis 41 radially expels the fluid coolant flow 85 past the rotor winding end turns 112 and radially outward from the rotor assembly 96.

During operation of the generator 14, the rotation of the magnetic field generated by the set of main machine rotor windings 110 relative to the set of main machine stator windings 90 generates electricity in the main machine stator windings 90. This magnetic interaction further generates heat in the set of main machine rotor windings 110 and main machine stator windings 90. In accordance with aspects described herein, coolant fluid can enter the rotatable shaft 40 of the rotor assembly 96 via the inlet port 82. The rotatable shaft 40 at least in part, can define the first coolant conduit 150, through which fluid can flow radially outward from the rotational axis 41. Fluid from the first coolant conduit 150 can pass through the first radial coolant passage 154 to be radially received by the coolant spray ring 125 and distributed through the coolant channels 187 to the first cavity 161. Fluid can continue to flow radially outward through the first cavity 161 and through the radial rotor end turn passages 156 that pass between the rotor windings 110 that form the second coolant conduit 158 which transfers heat from the set of main machine rotor windings 110 into the coolant by conduction. The coolant is radially expelled from radial rotor end turn passages 156 into the second cavity 162, where it further collects at the fluid collection surface 149. The angle 165 of the fluid collection surface 149 can redirect the fluid coolant flow 85 to the coolant outlet 142, where it is further radially expelled outward to contact the set of stator windings 90 to thereby remove heat from the stator windings 90 into the coolant.

Figure 8:
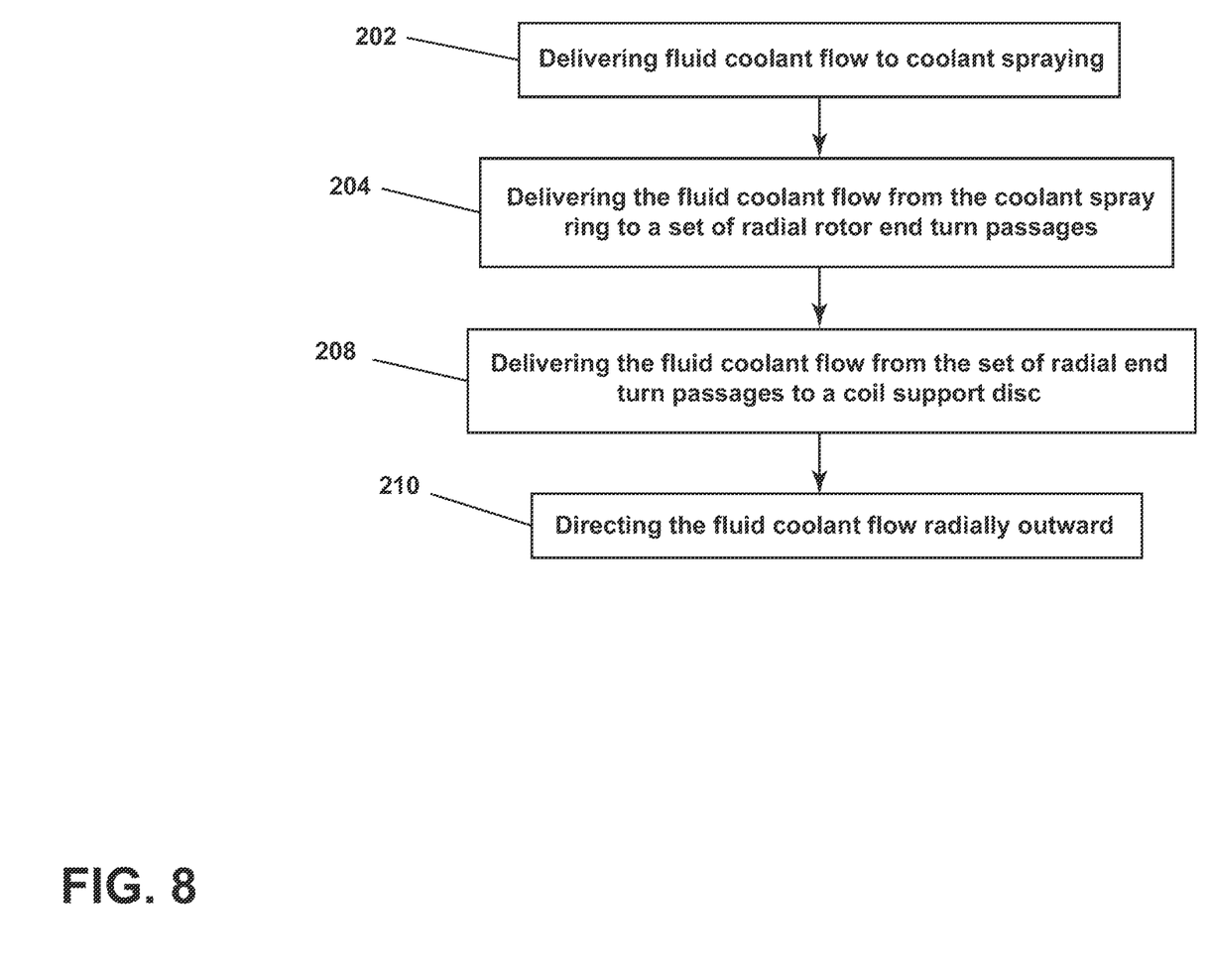
FIG. 8 illustrates an exemplary method flowchart diagram of cooling a rotor assembly, in accordance with various aspects described herein.

FIG. 8 illustrates a method 200 of cooling the set of rotor winding end turns 112 of the rotor assembly 96. At 202, the method 200 includes delivering the fluid coolant flow 85 to the coolant spray ring 125. A non-limiting example of delivering the fluid coolant flow 85 to the coolant spray ring 125 can include delivering the fluid coolant flow 85 flowing from the first coolant conduit 150 radially through the first radial coolant passage 154. For example, the fluid coolant flow 85 can be delivered into one or more grooves 129 defined on the inner annular surface of the coolant spray ring 125. In a non-limiting aspect, the delivering the fluid coolant flow 85 to the coolant spray ring 125 can include delivering the fluid coolant flow 85 from the first coolant conduit 150 radially through the first radial coolant passage 154 to the set of coolant channels 187 defined through the coolant spray ring 125, and to the corresponding spray nozzles 190.

At 204, the method 200 can include delivering the fluid coolant flow 85 from the coolant spray ring 125 to the set of radial rotor end turn passages 156 that extend radially through the set of rotor winding end turns 112.

At 208, the method 200 can include delivering the fluid coolant flow 85 from the set of radial end turn passages 156 to the coil support disc 131. A non-limiting example of delivering the fluid coolant flow 85 from the set of radial end turn passages 156 to the coil support disc 131 can include delivering the fluid coolant flow 85 from the set of radial end turn passages 156 to a set of radially inner surfaces 145 of the coil support disc 131. In non-limiting aspects, the radially inner surfaces 145 can define be in fluid communication with a set of support disc channels 146 defined through the coil support disc 131. Another non-limiting example of delivering the fluid coolant flow 85 from the set of radial end turn passages 156 to the coil support disc 131 can include delivering the fluid coolant flow 85 from the set of radial end turn passages 156 to of the support disc channels 146.

In non-limiting aspects, the method 200 can include at 210, the directing the fluid coolant flow 85 radially outward. In non-limiting aspects the directing the fluid coolant flow 85 radially outward can include, directing, by the fluid collection surface 149 the fluid coolant flow 85 radially outward toward the outlet channel 163. The redirecting from the fluid collection surface 149 toward the outlet channel 163 allows the fluid coolant flow 85 to flow radially outward from the rotor assembly 96.

One or more of the first cavity 161, the second coolant conduit 158, the set of radial rotor end turn passages 156 or the second cavity 162 are in a thermally conductive relationship with the set of rotor winding end turns 112 so heat from the set of rotor winding end turns 112 is transferred by conduction to the second coolant conduit 158. The conduction of heat to the second coolant conduit 158 and the thermally conductive relationships described herein can result in the fluid coolant flow 85 removing heat from the rotor assembly 96.

It is contemplated that the method 200 can include the expelling, by a nozzle, the redirected fluid coolant flow 85 toward a set of stator windings. It is further contemplated that the method 200 can include redirecting at 208 that further includes redirecting the fluid coolant flow 85 by the fluid collection surface 149 disposed at the angle 165 relative to the rotational axis 41 of the rotor assembly 96.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method.

Many other possible aspects and configurations in addition to that shown in the above figures are contemplated by the present disclosure. For example, one aspect of the disclosure contemplates coolant conduits that extend along alternative portions or lengths of the set of rotor windings. In another example, the windings or the coolant conduits can further include intervening thermally conductive layers to assist in thermal conduction while, for example, avoiding an electrically conductive relationship between respective components. Additionally, the design and placement of the various components such as valves, pumps, or conduits can be rearranged such that a number of different in-line configurations could be realized.

The aspects disclosed herein provide method and apparatus for cooling a set of rotor windings or a set of rotor winding end turns during electric machine operations (e.g. motor or generator operations). One advantage that may be realized in the above aspects is that the above described aspects have significantly improved thermal conduction to remove heat from the set of rotor windings or the set of rotor winding end turns. The improved thermal conductivity between the set of rotor winding end turns and the coolant conduits coupled with the coolant channels provide for heat removal in a much more effective fashion from the rotor winding end turns to the coolant.

The increased thermal dissipation of the rotor winding end turns allows for a higher speed rotation, which may otherwise generate too much heat. The higher speed rotation may result in improved power generation or improved generator efficiency without increasing generator size. The described aspects having the fluid channels for the wet cavity machine are also capable of cooling the stator windings or end turn segments which further reduces thermal losses of the electric machine. Reduced thermal losses in the electric machine allows for greater efficiency and greater power density of the generator.

When designing aircraft components, reliability is also informant feature. The above described end assembly can provide additional physics stability and improved cooling to the rotor winding end turns. The stability and cooling provided by the end support allow an increase in performance and reliability.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A coil support assembly for a set of rotor windings of an electromotive machine, comprising: a coil support disc comprising a radially inner portion and a radially outer portion, the radially inner portion rotatably coupled to a rotatable shaft of the electromotive machine, the radially outer portion defining a set of channels therethrough in fluid communication with the rotor windings, the radially outer portion configured to overlie an end turn of the rotor windings relative to a rotational axis of the rotatable shaft.

The coil support assembly of any preceding clause, further comprising a retaining bracket, fastened to the radially outer portion.

The coil support assembly of any preceding clause, wherein the retaining bracket is disposed outboard from the support disc with respect to the electromotive machine.

The coil support assembly of any preceding clause, wherein the radially inner portion is coupled to the radially outer portion via a set of spokes.

The coil support assembly of any preceding clause, wherein each respective spoke is disposed between a corresponding end turn of the set of rotor windings a rotor core of the electromotive machine.

The coil support assembly of any preceding clause, wherein the radially outer portion comprises a set of arcuate segments.

The coil support assembly of any preceding clause, wherein a number of arcuate segments corresponds to a number of poles of the electromotive machine.

A method of cooling rotor winding end turns of a rotor assembly of an electromotive machine, comprising: receiving a fluid coolant flow at a coil support disc having a radially inner portion and a radially outer portion, the radially inner portion rotatably coupled to a rotatable shaft of the electromotive machine, and further coupled to the radially outer portion via a set of radially extending spokes, the radially outer portion configured to overlie a rotor winding end turn relative to a rotational axis of the rotor assembly, the radially outer portion defining a set of channels therethrough; delivering the fluid coolant flow through a set of passages extending radially through the rotor winding end turns and in a thermally conductive relationship with the rotor windings; collecting, at a collection surface of the radially outer portion of the coil support disc, the fluid coolant flow from the set of passages; and redirecting, by the collection surface, the fluid coolant flow radially outward from the rotor assembly.

The method of any preceding clause, further comprising expelling, by the radially outer portion, the fluid coolant flow toward a set of stator windings.

A rotor assembly for an electric machine comprising: a rotatable shaft having a rotational axis and defining a first coolant conduit fluidly connected with a source of coolant; a rotor core fixed relative to the rotatable shaft and defining at least one rotor post; a set of rotor windings wound around the rotor post and defining a corresponding set of rotor winding end turns extending axially beyond the rotor core; and a coil support assembly fixed to the rotatable shaft, the coil support assembly including a coil support disc comprising a radially inner portion and a radially outer portion, the radially inner portion rotatably coupled to a rotatable shaft of the electromotive machine, and the radially inner portion further coupled to the radially outer portion via a set of radially extending spokes; the radially outer portion configured to overlie the set of rotor winding end turns relative to the rotational axis, defining a set of channels therethrough in fluid communication with the rotor winding end turn.

The rotor assembly of any preceding clause, further comprising a retaining bracket fastened to the radially outer portion.

The rotor assembly of any preceding clause, wherein the retaining bracket is disposed outboard from the coil support disc with respect to the electric machine.

The rotor assembly of any preceding clause, wherein each respective spoke is disposed between a corresponding end turn of the set of rotor windings and the rotor core.

The rotor assembly of any preceding clause, further comprising a coolant spray ring fixed relative to the rotatable shaft and arranged to receive a flow of coolant therefrom.

The rotor assembly of any preceding clause, wherein the coolant spray ring defines a set of channels therethrough in fluid communication with the set of rotor winding end turns.

The rotor assembly of any preceding clause, wherein the radially outer portion comprises a set of arcuate segments.

The rotor assembly of any preceding clause, wherein each arcuate segment corresponds to a respective pole of the electric machine.

The rotor assembly of any preceding clause, wherein the set of channels respectively define a set of collection surfaces angled to redirect a flow of coolant.

The rotor assembly of any preceding clause, wherein the rotor winding end turns include end turn passages extending radially through the rotor winding end turns and in a thermally conductive relationship with the rotor winding end turns.

The rotor assembly of any preceding clause, wherein a rotation of the rotatable shaft about the rotational axis radially expels a flow of coolant past the rotor winding end turns and radially outward from the rotor assembly.

What is claimed is:

1. A coil support assembly for a set of rotor windings of an electric machine, comprising:
   a coil support disc comprising a radially inner portion and a radially outer portion, the radially inner portion rotatably coupled to a rotatable shaft of the electric machine, the radially outer portion comprising a set of arcuate segments respectively defining a set of channels therethrough in fluid communication with the rotor windings, the set of arcuate segments configured to overlie an end turn of the rotor windings relative to a rotational axis of the rotatable shaft; and
   a retaining bracket surrounding the coil support disc and fastened to the set of arcuate segments.

2. The coil support assembly of claim 1, wherein the retaining bracket is disposed outboard from the coil support disc with respect to the electric machine.

3. The coil support assembly of claim 1, wherein the radially inner portion is coupled to the set of arcuate segments via a set of spokes.

4. The coil support assembly of claim 3, wherein each respective spoke is disposed between a corresponding end turn of the set of rotor windings a rotor core of the electric machine.

5. The coil support assembly of claim 1, wherein a number of arcuate segments corresponds to a number of poles of the electric machine.

6. A method of cooling rotor winding end turns of a rotor assembly of an electric machine, comprising:
   receiving a fluid coolant flow at a coil support disc having a radially inner portion and a radially outer portion, the radially inner portion rotatably coupled to a rotatable shaft of the electric machine, and further coupled to the radially outer portion via a set of radially extending spokes, the radially outer portion comprising a set of arcuate segments respectively defining a set of channels therethrough, the set of arcuate segments configured to overlie a rotor winding end turn relative to a rotational axis of the rotor assembly, and a retaining bracket surrounding the coil support disc and fastened to the set of arcuate segments;
   delivering the fluid coolant flow through a set of passages extending radially through the rotor winding end turns and in a thermally conductive relationship with the rotor winding end turns;
   collecting, at a collection surface of the radially outer portion of the coil support disc, the fluid coolant flow from the set of passages; and
   redirecting, by the collection surface, the fluid coolant flow radially outward from the rotor assembly.

7. The method of claim 6, further comprising expelling, by the radially outer portion, the fluid coolant flow toward a set of stator windings.

8. A rotor assembly for an electric machine comprising:
a rotatable shaft having a rotational axis and defining a first coolant conduit fluidly connected with a source of coolant;
a rotor core fixed relative to the rotatable shaft and defining at least one rotor post;
a set of rotor windings wound around the rotor post and defining a corresponding set of rotor winding end turns extending axially beyond the rotor core; and
a coil support assembly fixed to the rotatable shaft, the coil support assembly including:
  a coil support disc comprising a radially inner portion and a radially outer portion, the radially inner portion rotatably coupled to a rotatable shaft of the electric machine, and further coupled to the radially outer portion via a set of radially extending spokes; and the radially outer portion comprising a set of arcuate segments respectively configured to overlie the set of rotor winding end turns relative to the rotational axis, the set of arcuate segments defining a set of channels therethrough in fluid communication with the rotor winding end turn; and
  a retaining bracket surrounding the coil support disc and fastened to the set of arcuate segments.

9. The rotor assembly of claim 8, wherein the retaining bracket is disposed outboard from the coil support disc with respect to the electric machine.

10. The rotor assembly of claim 8, wherein each respective spoke is disposed between a corresponding end turn of the set of rotor windings and the rotor core.

11. The rotor assembly of claim 8, further comprising a coolant spray ring fixed relative to the rotatable shaft and arranged to receive a flow of coolant therefrom.

12. The rotor assembly of claim 11, wherein the coolant spray ring defines a set of channels therethrough in fluid communication with the set of rotor winding end turns.

13. The rotor assembly of claim 11, wherein each arcuate segment corresponds to a respective pole of the electric machine.

14. The rotor assembly of claim 8, wherein the set of channels respectively define a set of collection surfaces angled to redirect a flow of coolant.

15. The rotor assembly of claim 8, wherein the rotor winding end turns include end turn passages extending radially through the rotor winding end turns and in a thermally conductive relationship with the rotor winding end turns.

16. The rotor assembly of claim 15, wherein a rotation of the rotatable shaft about the rotational axis radially expels a flow of coolant past the rotor winding end turns and radially outward from the rotor assembly.

\* \* \* \* \*